(12) United States Patent
Baba et al.

(10) Patent No.: US 6,785,093 B2
(45) Date of Patent: Aug. 31, 2004

(54) SLIDER, HEAD ASSEMBLY, AND DISK DRIVE UNIT

(75) Inventors: Sachiyo Baba, Yamato (JP); Yasunori Kawamoto, Fujisawa (JP); Shunichiroh Ohta, Machida (JP); Masayuki Kanamaru, Fujisawa (JP)

(73) Assignee: Hitachi Global Storage Technologies, Inc. Netherlands B.V, Amsterdam (NL)

( * ) Notice: Subject to any disclaimer, the term of this patent is extended or adjusted under 35 U.S.C. 154(b) by 243 days.

(21) Appl. No.: 10/041,751

(22) Filed: Jan. 7, 2002

(65) Prior Publication Data

US 2002/0089789 A1 Jul. 11, 2002

(30) Foreign Application Priority Data

Jan. 9, 2001 (JP) ........................................ 2001-001966

(51) Int. Cl.$^7$ ................................................ G11B 5/60
(52) U.S. Cl. ................................ 360/235.7; 360/235.6; 360/235.8; 360/236; 360/236.2
(58) Field of Search ........................... 360/235.7, 235.8, 360/236, 236.3, 235.6, 236.2

(56) References Cited

U.S. PATENT DOCUMENTS

| | | | |
|---|---|---|---|
| 5,796,551 A | 8/1998 | Samuelson | |
| 5,917,679 A | 6/1999 | Park et al. | |
| 6,040,958 A | 3/2000 | Yamamoto et al. | |
| 6,529,346 B2 * | 3/2003 | Otsuka | 360/235.8 |
| 6,535,353 B2 * | 3/2003 | Boutaghou et al. | 360/235.1 |
| 2002/0001157 A1 | 1/2002 | Kang et al. | |

* cited by examiner

*Primary Examiner*—Robert S. Tupper
(74) *Attorney, Agent, or Firm*—Robert B. Martin; Bracewell & Patterson, L.L.P.

(57) ABSTRACT

A slider 3a is disposed to face a disk-like recording medium and enabled to support a read/write head. The slider 3a has an air bearing surface formed between a leading edge 10 and a trailing edge 11; side rails 20 and 21 formed on the air bearing surface almost like a U-letter so as to dispose its tip at the trailing edge side 11; a cross rail 22; and a pair of landing pads 30a and 31a formed between the tip of each of the side rails and the cross rail 20 to 22 and the trailing edge 11. One of the pair of landing pads 30a and 31a is formed as a convex surface at its side facing the rail of the landing pad 31a disposed at the outer periphery side of the disk-like recording medium while the slider is disposed so as to face the disk-like recording medium.

11 Claims, 11 Drawing Sheets

*Fig. 1(a)*

A-A CROSS SECTIONAL VIEW

*Fig. 1(b)*

B-B CROSS SECTIONAL VIEW

SLIDER, HEAD ASSEMBLY, AND DISK DRIVE UNIT

This application claims the priority benefit of Japanese Patent Application No. 2001-001966, filed on Jan. 9, 2001, and entitled "Slider, Head Assembly, and Disk drive Unit."

BACKGROUND OF THE INVENTION

1. Technical Field

The present invention relates to a slider provided with a head for reading/writing data from/on a magnetic disk, more particularly to a technique that can reduce deposition of particles on the slider.

2. Description of the Related Art

A hard disk drive (HDD), which is the most popular recording means of computers, is structured so as to drive a single or a plurality of magnetic disks disposed at the same rotation axis with use of a spindle motor. A head disposed so as to face a magnetic disk is used to read/write data on/from the magnetic disk. This head is driven by an actuator, generally referred to as a voice coil motor (hereafter, to be described as the VCM). The magnetic disk, the head, and the actuator are all housed in an enclosure referred to as a disk enclosure. Such a disk enclosure is configured by a thin box like base, for example, an aluminum alloy base and a top cover for sealing the opening of the base.

Some of such heads used to read/write data have a transducer for writing data and magnetizing means for reading data separately. The magnetizing means for reading is realized actually by, for example, the magneto resistive (MR) effect or the giant magneto resistive (GMR) effect. The magnetizing means for reading, which employs the MR or GMR, is affected less by noise, thereby it can improve the recording density of disks. A head is disposed at a predetermined position of a member referred to as a slider. A slider includes a head sometimes. Sometimes the slider means the head simply. Concretely, sometimes the head and the slider are recognized to be equivalent to each other.

When such a head reads/writes data from/on a magnetic disk, the head (slider) flies above the magnetic disk at a predetermined height. This flight of the head above the magnetic disk is caused by the air bearing induced on the magnetic disk by the rotation of the magnetic disk. This is why the surface of the slider, which faces the magnetic disk, is referred to as an air bearing surface (hereinafter, to be described as the ABS). The property of this ABS affects the flight of the slider significantly.

The flying height of the slider from the magnetic disk should therefore be as low as possible when much consideration is given to reading/writing of data. This is because the mutual magnetic action between the magnetic disk and the head must be secured enough. Consequently, a slider that flies low should be employed for higher density magnetic recording. An excessively low flying height will cause the head to come in contact with fine projections formed on the surface of the magnetic disk, however. It is therefore indispensably important to smooth the surface of the magnetic disk so as to realize high density magnetic recording.

There is a conventional disk drive unit in which the slider is enabled to rest in a retreat area formed on a magnetic disk while the magnetic disk does not rotate and the slider flies from the retreat area when the magnetic disk begins rotating so as move (seek) to a data recorded area of the magnetic disk. This disk drive unit is referred to as a contact start and stop (CSS) type disk drive unit. On the contrary, there is also a loading/unloading type disk drive unit in which the slider is retreated to a ramp formed outside a magnetic disk while the magnetic disk does not rotate.

3. Problems to be Solved by the Invention

The main technical issues of the HDD are improvement of the recording capacity per magnetic disk and faster reading/writing data from/on the magnetic disk. Faster reading/writing data from a magnetic disk can be realized by reducing the seek time with which the magnetic head moves to a target track on the magnetic disk. Because the head is driven by a VCM as described above, the VCM performance is improved so as to improve the seek time. And, in order to improve the VCM, it is just required to employ a permanent magnet of the VCM, having a stronger magnetic property or increasing the thickness of the permanent magnet so as to increase the magnetic field to be applied to the voice coil of the VCM.

Reading/writing of data can also be made faster by increasing the rotation speed of the magnetic disk. In this case, however, faster rotation of the magnetic disk causes particles to hit the slider (head) more often when the number of particles in the subject HDD is the same as that when the rotation of the magnetic disk is slow. Particles mean powder existing in the HDD. Collision of those particles against the surface of the magnetic disk often causes hardware errors, that is errors in reading/writing of data, resulting in a loss of reliability in the HDD. On the other hand, because the flying height of the slider (head) from the magnetic disk has been required to be reduced so as to cope with the higher capacities of magnetic disks, the peril of collision of even fine particles that have been neglected against the slider (head) has also risen more and more.

Under such circumstances, it is an object of the present invention to provide a slider and a disk drive unit that can reduce read/write errors caused by particles, as well as assure reliability.

SUMMARY OF THE INVENTION

In order to achieve the above object, the present inventor observed actions of particles against a slider. As a result, the inventor recognized that the number of read/write errors was varied among the shapes of the ABS on a kind of a slider and there occurred a difference among the particles deposition states according to the ABS shape. Concretely, when the number of deposited particles is reduced, it is also possible to reduce the number of data read/write errors.

More concretely, the present invention provides a slider disposed so as to face a disk-like recording medium and enabled to support a head for reading/writing data from/on the disk. The slider comprises a slider body provided with an air leading edge, an air trailing edge, and an air bearing surface formed between the leading edge and the trailing edge; a rail formed almost like a U-letter on the air bearing surface so that its tip is disposed at the trailing edge side; and a pair of landing pads formed between the tip of the rail and the trailing edge. One of the pair of landing pads is curved convexly at its side facing the rail of the landing pad which is disposed at the outer periphery side of the disk-like recording medium while the slider is disposed so as to face the medium.

The slider of the present invention has the landing pads. And, the present inventor et al recognized through the examinations as described above that particles were apt to deposit at one side of a landing pad, which faces the rail. Especially, particles are apt to deposit on one of the pair of landing pads, which is disposed at the outer periphery side of the disk-like recording medium while the slider is disposed so as to face the medium. Thus, the inventor et al changed the shape of the landing pad and knew that the amount of deposited particles was varied among the shapes of the landing pad. Concretely, when the side of a landing pad, which faces the rail, is curved convexly, the deposition of particles can be reduced. This is why the slider of the present invention has been proposed. In the case of the present invention, the leading edge is disposed at the upstream of the trailing edge in the rotational direction of the disk-like recording medium.

Each landing pad of the slider of the present invention can be curved convexly in the center of the width direction. As to be described later, this is because deposition of particles on the landing pad can be reduced more significantly when the center portion in the width direction is curved convexly such way.

Furthermore, in the case of the slider of the present invention, a pad for applying a positive pressure to the slider can be formed on the rail, at the leading edge side, and between the pair of landing pads. When a surface that generates a negative pressure is formed in an area enclosed by the rail, the slider of the present invention functions as a negative pressure slider and it flies above the magnetic disk at a slower rotation speed. In addition, the slider can suppress the variation of the flying height in the radial direction of the disk-like recording medium.

Furthermore, the present invention provides a head assembly configured by a slider disposed so as to face a disk-like recording medium and enabled to support a head for reading/writing data from/on the medium and an actuator used to support and move the slider above the disk-like recording medium. The slider comprises a slider body provided with a leading edge and a trailing edge disposed at a predetermined interval therebetween in the rotational direction of the disk-like recording medium, an inner edge and an outer edge disposed at a predetermined interval therebetween in the radial direction of the disk-like recording medium, and an air bearing surface formed among the leading edge, the trailing edge, the inner edge, and the outer edge respectively; a cross rail formed along the leading edge; a pair of side rails extended from both ends of the cross rail to the trailing edge; a first pad formed between the cross rail and the boundary between the pair of side rails and enabled to apply a positive pressure to the slider; a pair of streamlined landing pads formed between the end of each of the side rails disposed at the trailing edge side and the trailing edge; a center rail formed between the pair of landing pads; and a second pad formed on the center rail and enabled to apply a positive pressure to the slider. Because the head assembly of the present invention has streamlined landing pads as described above, deposition of particles on those landing pads can be suppressed.

For the head assembly of the present invention, one of the pair of landing pads, which is disposed at the outer edge side, should preferably be streamlined to the air flow from the outer edge when the disk-like recording medium rotates. As to be described later, this is because particles are apt to deposit on one of the pair of landing pads, which is disposed at the outer edge side. In the case of the present invention, the inner edge means an edge disposed at the inner periphery of the disk-like recording medium while the slider is disposed so as to face the disk-like recording medium. The outer edge means an edge disposed at the outer periphery of the disk-like recording medium while the slider is disposed so as to face the disk-like recording medium.

In the head assembly of the present invention, each landing pad can have an inclined plane in the air flowing direction. It is a concrete example of the streamlined landing pad described above. When the landing pad is formed such way, the air flow cleans the inclined plane, thereby deposition of particles on the landing pad can be suppressed more effectively.

Furthermore, in the head assembly of the present invention, a negative pressure pocket can be formed in an area enclosed by the cross rail and the pair of side rails. The pocket applies a negative pressure to the slider when the disk-like recording medium rotates. Because of the combination of the first and second pads that apply a positive pressure to the slider respectively and the negative pressure pocket as described above, the slider of the present invention functions as a negative pressure slider, so that the slider can fly above the disk at a slower rotation speed. It is thus possible to suppress the variation of the flying height of the slider to occur in the radial direction of the disk-like recording medium.

Furthermore, the present invention provides a disk drive unit comprising a disk-like recording medium driven rotationally around a rotation axis and enabled to write data thereon; a slider provided with a head for reading/writing the data from/on the medium; an actuator for seeking the slider above the disk-like recording medium; and an enclosure for housing the disk-like recording medium, the slider, and the actuator. The slider comprises a slider body provided with an air leading edge, an air trailing edge, and an air bearing surface formed between the leading edge and the trailing edge; a rail formed almost like a U-letter on the air bearing surface so that its tip is disposed at the trailing edge side; and a pair of landing pads formed between the tip of the rail and the trailing edge. One of the pair of landing pads, which is disposed at the outer periphery side of the disk-like recording medium is provided with an inclined surface inclined in the width direction at its side facing the leading edge.

The disk drive unit of the present invention is provided with a pair of landing pads that configures the slider and one of the landing pads, which is disposed at the outer periphery side of the disk-like recording medium, is provided with an inclined plane inclined in the width direction at its side facing the leading edge. The air flow against the landing pad does not stagnate so much on such an inclined plane. In the case where the air flow stagnates, it causes particles to deposit more easily. The landing pad of the present invention, having such an inclined plane will therefore be effective for preventing the air flow from stagnation, thereby suppressing deposition of particles. After all, the present invention can reduce the number of hardware-caused errors, thereby improving the reliability of the disk drive unit.

In the disk drive unit of the present invention, the inclined plane may be varied freely in shape. Because the inclined plane of the present invention is formed so as to suppress deposition of particles on the landing pad, the inclined plane is formed just at a predetermined place of the subject landing pad at which such deposition of particles can be suppressed. Consequently, the inclined plane may be formed entirely or partly in the width direction of the landing pad. The inclined plane may be formed not only in a direction, but also in a plurality of directions. For example, the slider 3$b$ shown in FIG. 3 (to be described later) has landing pads, each of which has an inclined plane inclined in one direction. The slider 3$a$ shown in FIG. 1, however, has landing pads, each of which is inclined in a plurality of directions (actually, two directions).

BRIEF DESCRIPTION OF THE DRAWINGS

FIGS. 1($a$)–($c$) show an ABS of a slider 3$a$ employed in an embodiment of the present invention;

FIGS. 2(a)–(c) show how particles are deposited on the slider 3a;

DETAILED DESCRIPTION OF THE PREFERRED EMBODIMENT

Figure 10:
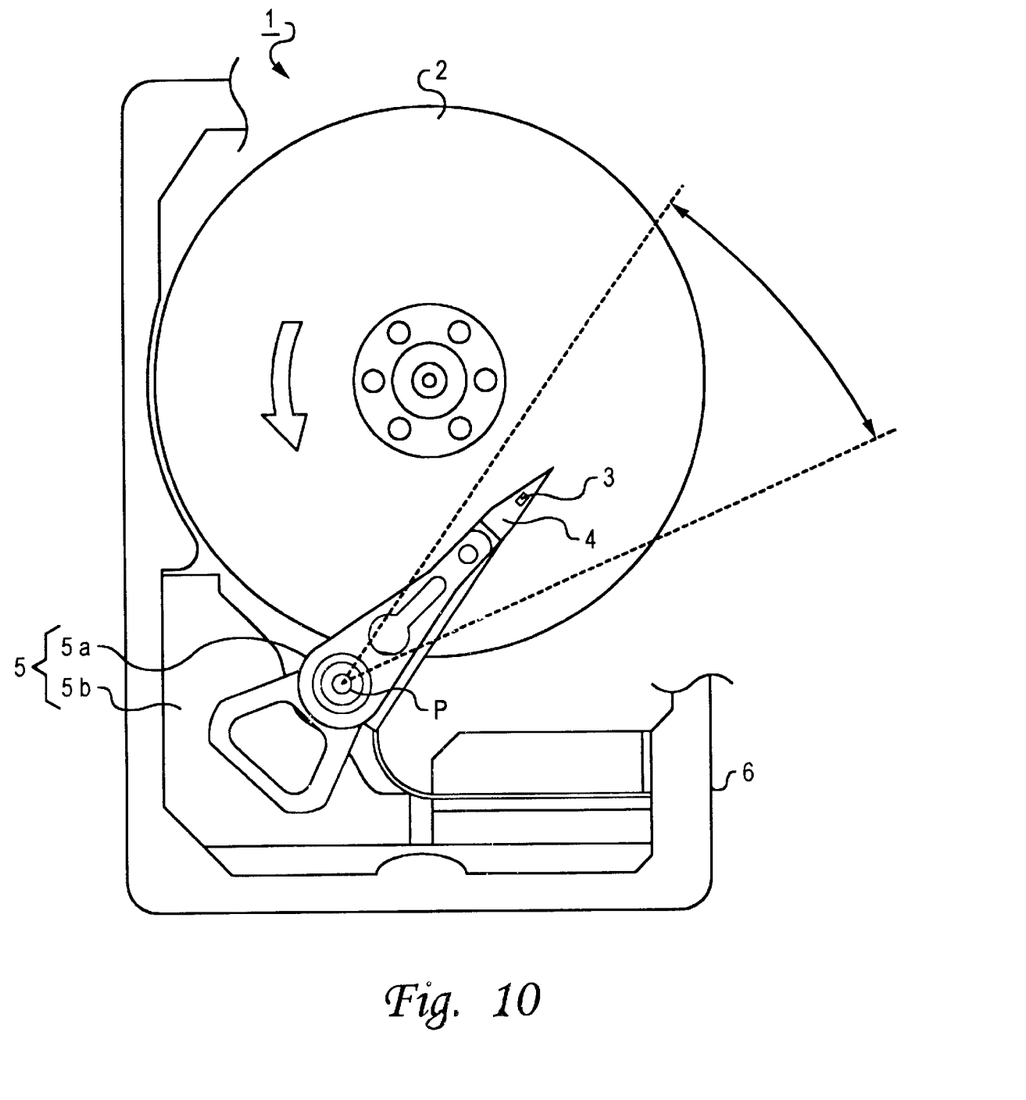
FIG. 10 shows a configuration of the HDD 1.
Figure 11:
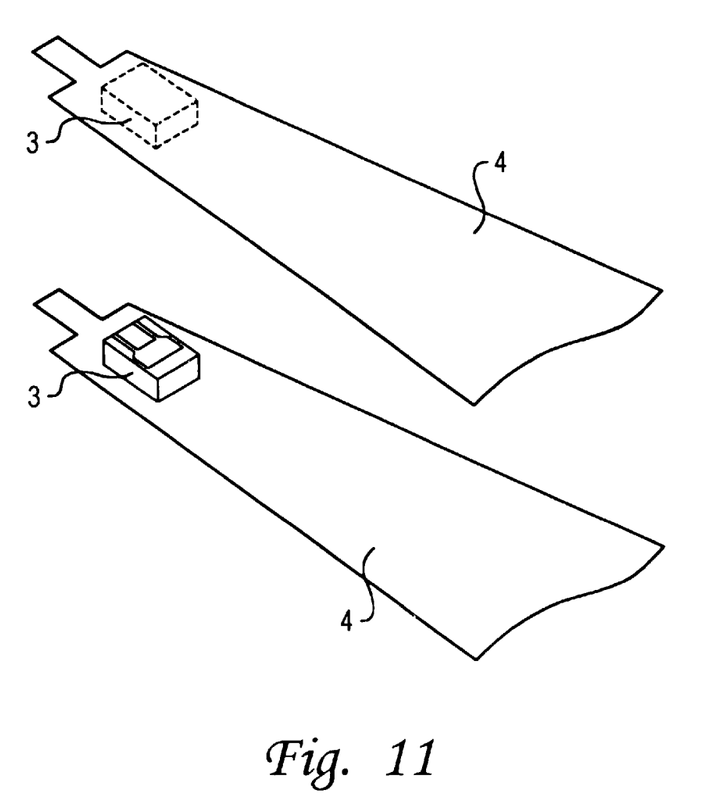
FIG. 11 is a perspective view of positioned sliders 3.

Hereunder, the preferred embodiment of the present invention will be described with reference to the accompanying drawings. FIG. 10 shows a schematic configuration of an HDD (hard disk drive) 1 in the embodiment of the present invention. In FIG. 10, a magnetic disk 2, which is a disk-like recording medium, is driven rotationally by a spindle motor (not shown) in the direction denoted by a white arrow. The magnetic disk 2 has a magnetic thin film formed as a magnetic recording layer on a glass or aluminum substrate. In FIG. 10, an actuator 4 provided with a slider 3 oscillates the range denoted by a solid line arrow around a pivot shaft P. This oscillating action is done by a voice coil motor 5 configured by a coil 5a for a voice coil motor and a magnet 5b for the voice coil motor provided at an end of the actuator 4 respectively. The parts for composing the HDD 1 such as the magnetic disk 2, the actuator 4, etc. are housed in a base 6, which is an enclosure made with an aluminum alloy, etc. The opening portion of the base 6 is sealed by a plate-like member referred to as a top cover. Usually, the magnetic disk 2 has a magnetic recording layer on both top and back sides respectively, so that two sliders 3 are disposed so as to face each other in corresponding to those top and back sides as shown in FIG. 11. And, an ABS (air bearing surface) is formed on the surface of each slider, which faces to the magnetic disk 2.

The slider 3 in this embodiment is a negative pressure slider that causes the ABS to generate a negative pressure. The flying height of the negative pressure slider 3 is decided by the balance among a negative pressure, a positive pressure, and an elastic force of a load spring of the actuator 4.

The positive pressure (flying force) is the largest impact for deciding the flying height of the slider 3. Generally, the faster the rotation speed of the magnetic disk 2 becomes, the higher the positive pressure becomes. Even when the angular speed ω of the magnetic disk 2 is fixed, the circumferential speed V is varied according to the position r of the slider above the disk in the radial direction. Concretely, the circumferential speed V satisfies the relationship of V=r·ω, the further the outer periphery of the magnetic disk 2 goes, the faster the circumferential speed V becomes. Consequently, the flying height decided by the positive pressure is increased more at an outer peripheral area, which is further separated from the center of the magnetic disk 2. The negative pressure slider 3 is mainly intended to suppress the variation of the flying height according to the position of the slider above the magnetic disk 2 in the radial direction by generating the negative pressure corresponding to the increase. The slider 3 can fly at a slower rotation speed than conventional one. In addition, the flying height of the slider 3 can be reduced. In this meaning, the negative pressure slider 3 will be an effective technique for the high recording density magnetic disk 2.

Furthermore, the present inventor created a slider 3 provided with some different ABSs and measured hardware errors to occur when particles were applied in the HDD 1 intentionally. At the same time, the inventor observed how particles deposited on each ABS.

Figure 1A:
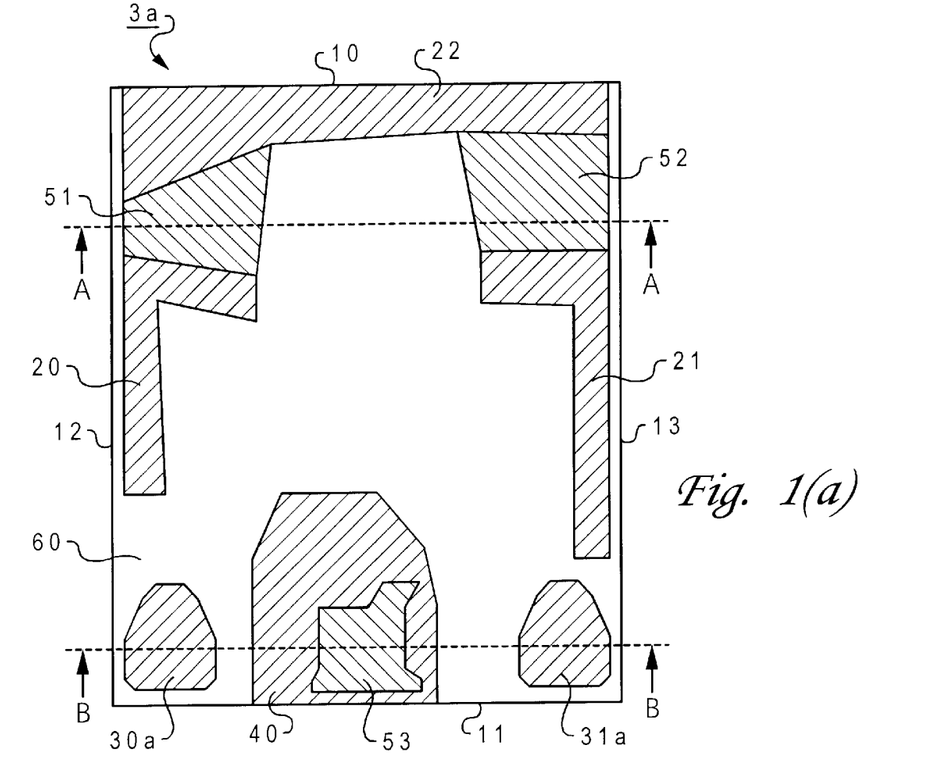
Figure 3:
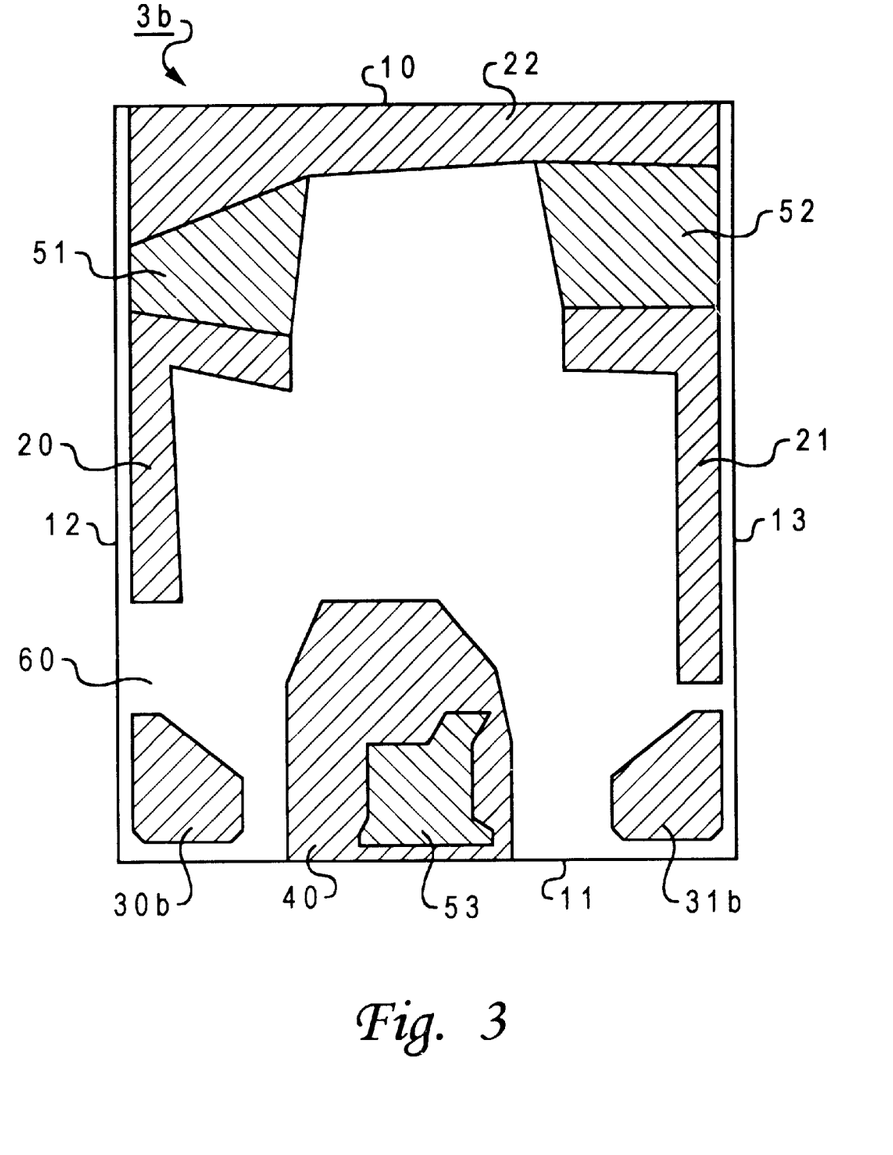
FIG. 3 shows an ABS of a slider 3b employed in the embodiment of the present invention.
Figure 4A:
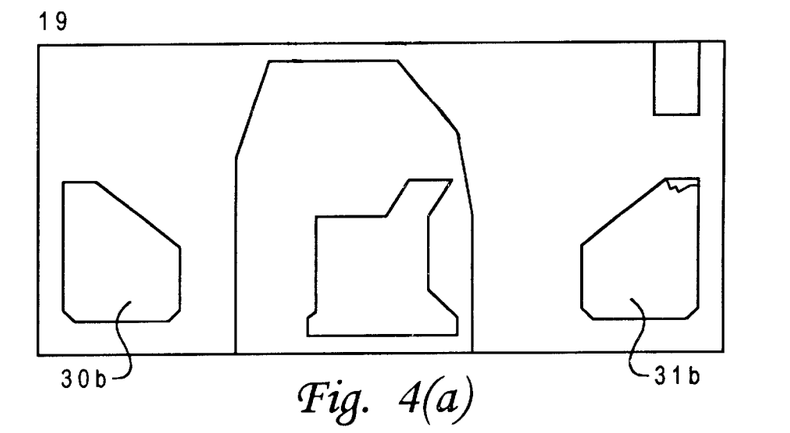
FIGS. 4(a)–(c) show how particles deposit on the slider 3b.
Figure 4B:
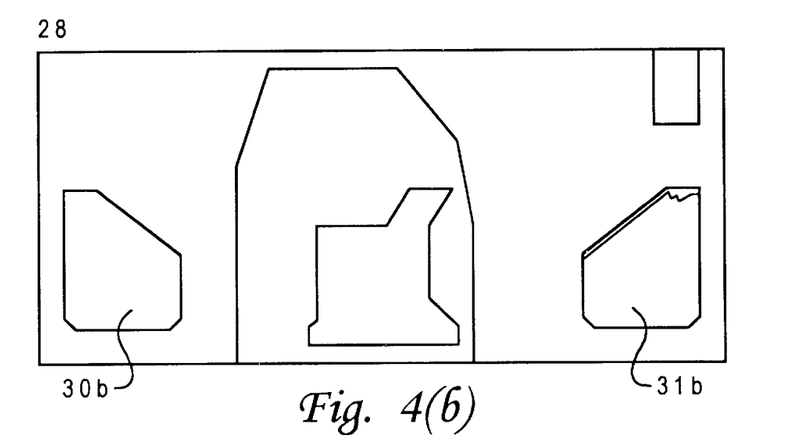
Figure 4C:
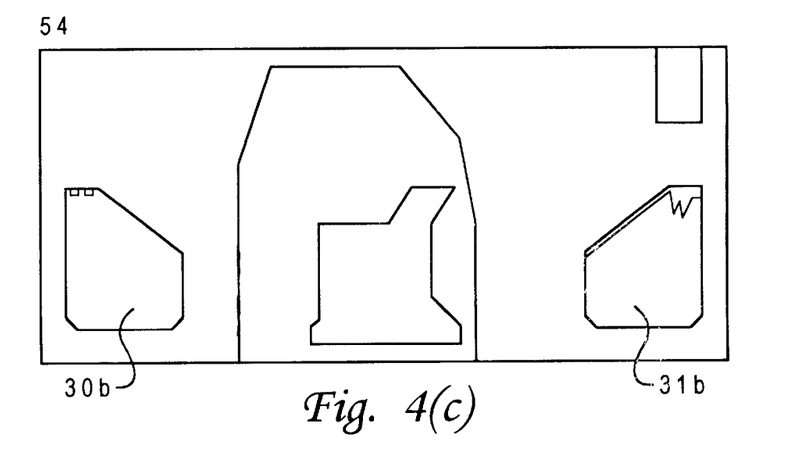
Figure 5:
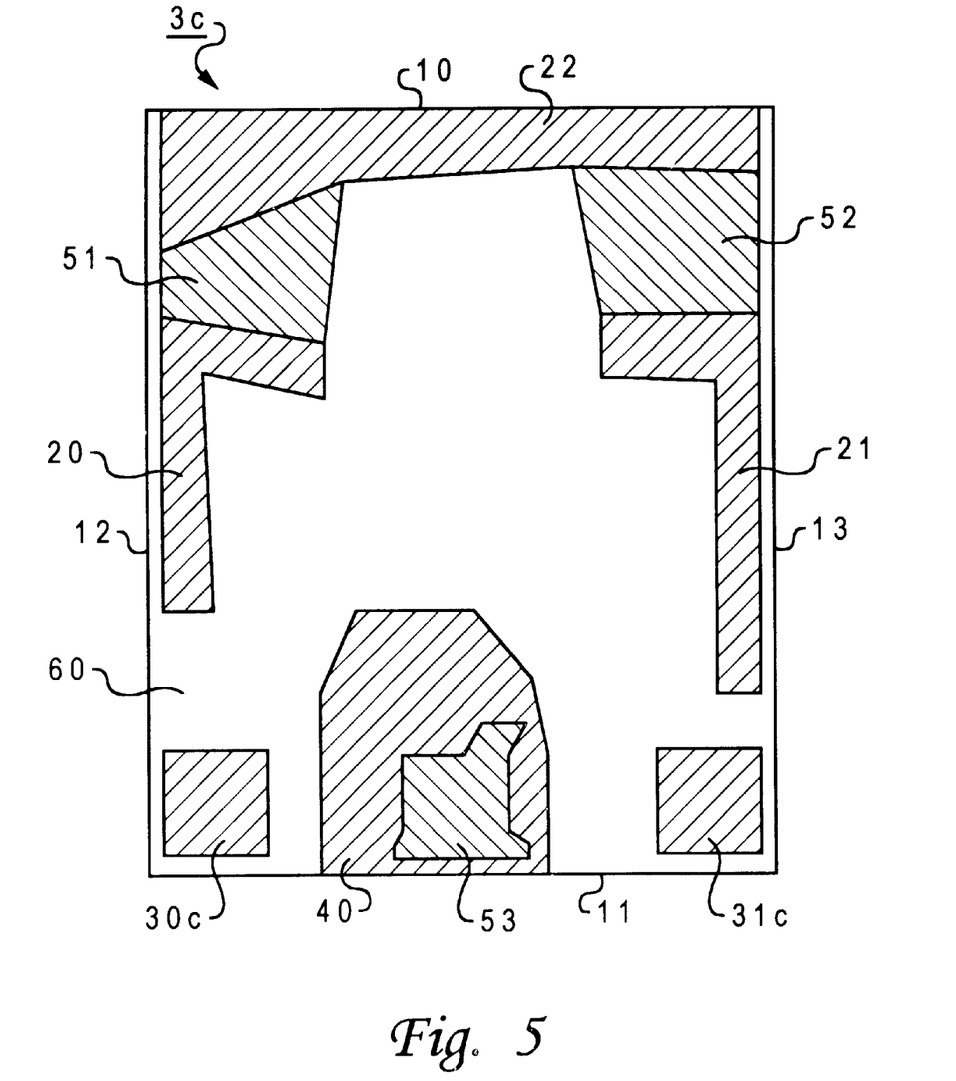
FIG. 5 shows an ABS of a slider 3c employed in the embodiment of the present invention.
Figure 6A:
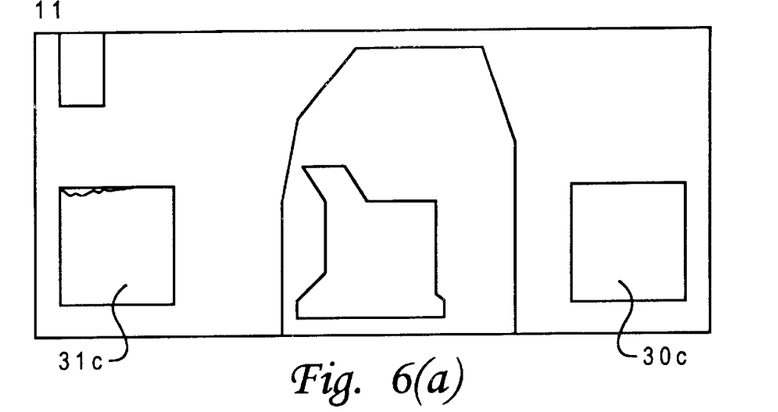
FIGS. 6(a)–(c) show particles deposit on the slider 3c.
Figure 6B:
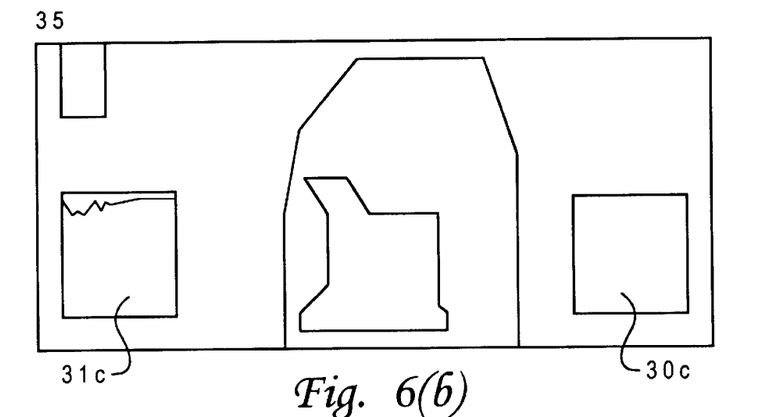
Figure 6C:
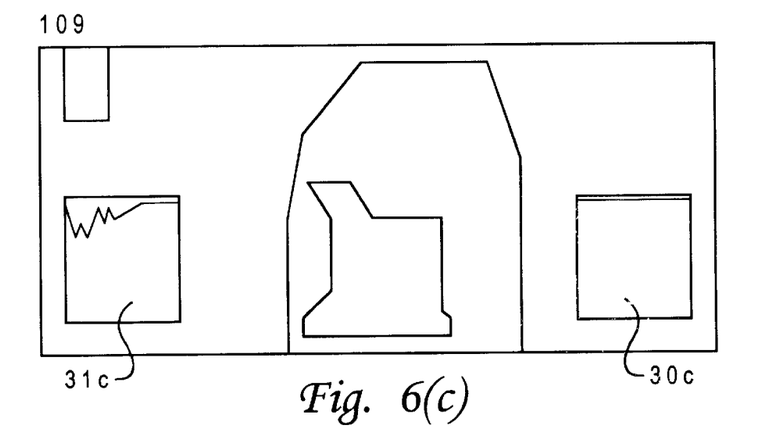

FIGS. 1, 3, and 5 show various ABS types employed for the slider 3 in the above experiments. Hereinafter, the slider 3 shown in FIGS. 1, 3, and 5 will be referred to as 3a, 3b, and 3c. The sliders 3a, 3b, and 3c are all identical in shape except for the shape of the landing pads. A contrast level in FIGS. 1, 3, and 5 denotes a height; the darkest denotes the highest portion and the white denotes the lowest portion.

In FIG. 1, the slider 3a has a leading edge 10, a trailing edge 11, an inner edge 12, and an outer edge 13. The leading edge 10 is an edge to which the air flows when the slider 3a flies above the rotating magnetic disk 2 at a predetermined height while the ABS faces the magnetic disk 2. The air flowing to the leading edge 10 goes out from the trailing edge 11. A slight air also flows to both inner and outer edges 12 and 13 and goes out from the training edge 11.

The slider 3a is provided with two side rails 20 and 21, as well as a cross rail 22. The side rails 20 and 21 are connected to the cross rail 22 respectively into a rail that looks light a U-letter. Each of the side rails 20 and 21 receives a positive pressure so as to keep the right-left balance of the slider 3a during flying. A predetermined distance is secured between the tip of each of the side rails 20 and 21 and the training edge 11. At the boundary between each of the side rails 20 and 21 and the cross rail 22 are formed ABS pads 51 and 52. The ABS pads 51 and 52 apply a positive pressure to the slider 3a respectively.

Between the tip of each of the side rails 20 and 21 and the trailing edge 11 are formed two landing pads 30a and 31a. When the slider 3a is disposed so as to face the magnetic disk 2, the landing pad 30a is disposed at the inner periphery side of the magnetic disk 2 while the landing pad 31a is disposed at the outer periphery side of the magnetic disk 2.

The side rails 20 and 21 may be extended up to the training edge 11. In such a case, however, the flying height of the slider 3 is varied according to the position of the slider 3 above the magnetic disk 2 in the radial direction. When the landing pads 30a and 31a are formed while the side rails 20 and 21 are formed within a predetermined length respectively as in case of the slider 3a in this embodiment, the flying height of the slider 3a can be stabilized regardless of its position in the radial direction of the magnetic disk 2. The landing pads 30a and 31a, when the slider 3 comes in contact with the magnetic disk 2, functions as an auxiliary wheel for protecting the head (to be described later). Between the landing pads 30a and 31a is formed a center rail 40. And, above the center rail 40 is formed an ABS pad 53. The ABS pad 53 as well as ABS pads 51 and 52 applies a positive pressure to the slider 3a respectively.

Figure 1B:
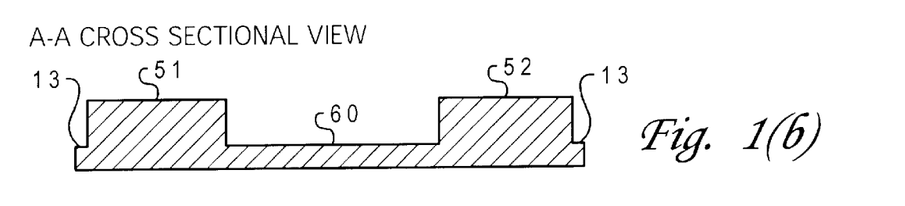
Figure 1C:
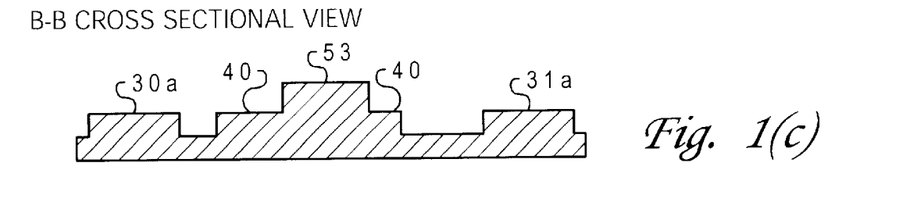
Figure 2A:
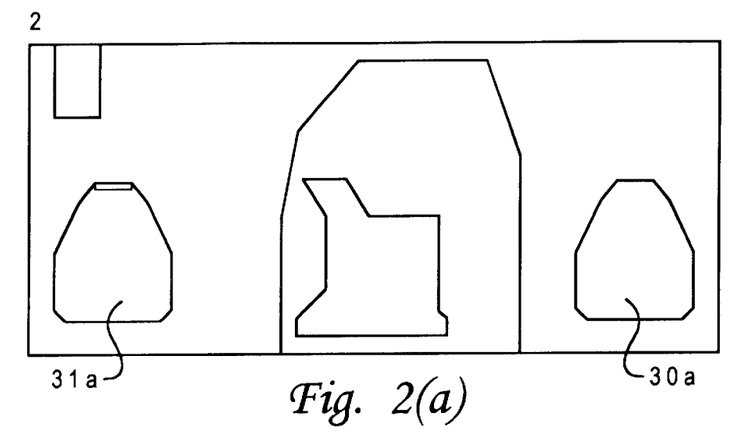
Figure 2B:
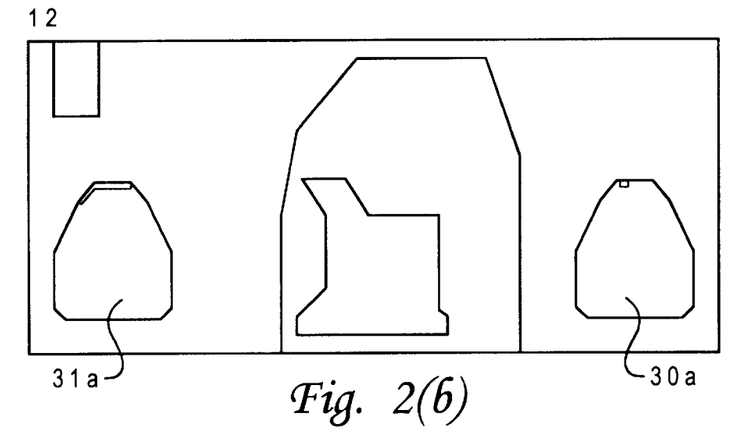
Figure 2C:
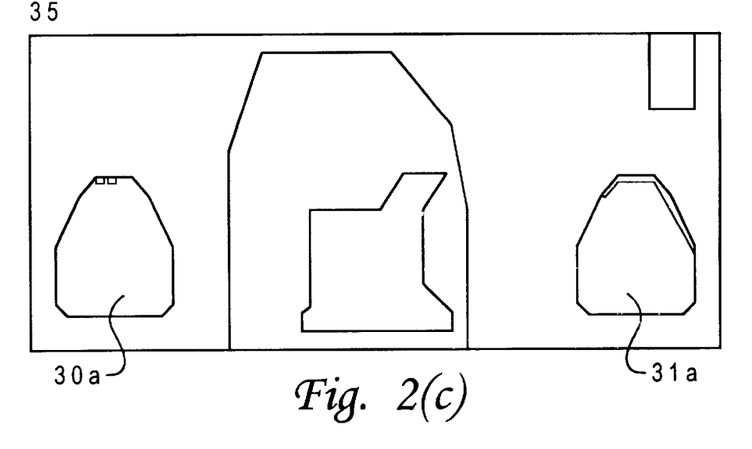

As described above, in FIG. 1, a contrast level denotes a flying height of the slider. FIG. 1 also shows both A—A cross sectional view and the B—B cross sectional view. The ABS pads 51, 52, and 53 are highest and equal to each other in height. The side rails 20 and 21, the cross rail 22, the landing pads 30*a* and 31*a*, and the center rail 40 follow the ABS pads 51 to 53 in height. The side rails 20 and 21, the cross rail 22, the landing pads 30*a* and 31*a*, and the center rail 40 are all equal in height. Other parts are all lowest portions that are denoted in white. The ABS pads 51 to 53 are standards against which the plane is recognized as a recess 60. This pocket-like recess 60 generates a negative pressure.

The ion milling method is employed as a process preferred to form the stepped ABS of the slider 3*a*. Concretely, the ion milling method is used for etching of the slider 3*a* masked in a predetermined form, thereby the ABS as shown in FIG. 1 can be obtained. Because the slider 3*a* is stepped in three levels, the etching by ion milling must be done in two steps. This method is well known among those skilled in the art, so the detailed description of the method will be omitted here.

This completes the description of the slider 3*a* shown in FIG. 1. Basically, the shapes of the sliders 3*b* and 3*c* shown in FIGS. 3 and 5 are the same as that of the slider 3*a*. The same reference numerals will therefore be given to the same items in FIGS. 3 and 5 as those shown in FIG. 1, avoiding redundant description. The shapes of the landing pads 30*a* to 30*c*, as well as 31*a* to 31*c* are only a difference among the sliders 3*a* to 3*c* shown in FIGS. 1, 3, and 5. Concretely, the slider 3*a* shown in FIG. 1 has a convex surface at one side facing the side rails 20 and 21.

This convex surface is formed in the center of the width direction (right-left direction in FIG. 1) of each of the landing pads 30*a* and 31*a*. The slider 3*b* shown in FIG. 3 has a convex surface at its one side facing the side rails 20 and 21 just like the slider 3*a* shown in FIG. 1. The slider 3*b* shown in FIG. 3 disposes the convex surface closer to the inner edge 12 and the outer edge 13. The sliders 3*a* and 3*b* shown in FIGS. 1 and 3 are identical in that they have a convex surface at its side facing the side rails 20 and 21 as described above, but they differ from each other in that the convex surfaces are formed at different positions. This difference may be regarded as a difference between the directions of the planes on which the convex surfaces are formed. Concretely, the slider 3*a* has a convex surface in the center of the width direction, so the inclined plane is inclined in two directions. On the contrary, the slider 3*b* has a convex surface at an end, so the inclined plane is inclined just in one direction. The slider 3*c* shown in FIG. 5 has a linear (flat) portion at its one side facing the side rails 20 and 21. With use of those sliders 3*a* to 3*c*, the inventor et al measured hardware errors to occur while particles were applied in the HDD 1 during operation intentionally and observed how particles deposited on each ABS.

The above experiences were done on the presumption that the HDD 1 had four 3.5 inch (foam factor) magnetic disks 2 to be rotated at a rated rotation speed of 10,000 rpm. Because four magnetic disks 2 were employed for the HDD 1, the number of sliders 3*a* to 3*c* (heads) was 8. Particles applied to each ABS were alumina ($Al_2O_3$) particles whose diameter was 1.0 µm. The particles were blown into the HDD 1 together with the air. At the same time, data was read from a magnetic disk 2 at random for 30 minutes and the number of read errors (hardware errors) was counted.

Figure 7:
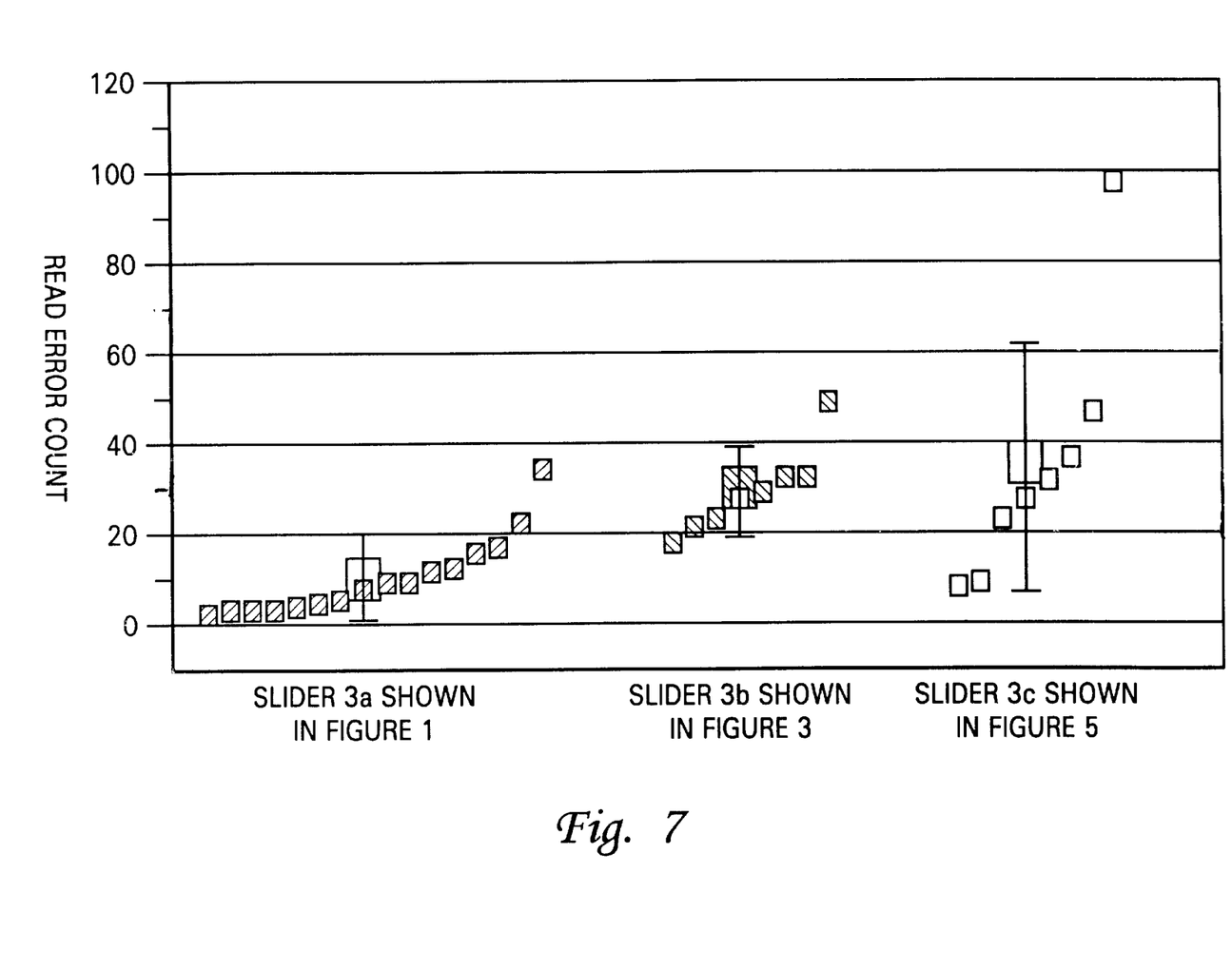
FIG. 7 shows the number of read errors detected in an HDD 1 with respect to each of the sliders 3a to 3c.

FIG. 7 shows the results, which are graphs for denoting the number of read errors detected from each of the sliders 3*a* to 3*c* (heads). FIG. 7 shows that the number of read errors becomes less sequentially in order of the slider 3*a* shown in FIG. 1, the slider 3*b* shown in FIG. 3, and the slider 3*c* shown in FIG. 5. Concretely, the number of read errors is less in the sliders 3*a* and 3*b* provided with landing pads 30*a* to 30*b*, as well as 31*a* to 31*b* provided with a convex surface at its side facing the side rails 20 and 21 respectively than the slider 3*c* provided with landing pads 30*c* and 31*c* are formed linearly at its side facing the side rails 20 and 21 is formed linearly respectively. In FIG. 7, a square denotes a slider, that is, a recording surface of the magnetic disk 2. As described above, the HDD 1 used for measuring the read errors is provided with four magnetic disks, so the measurement result of the slider 3*a* shown in FIG. 1 was obtained with use of two units of the HDD 1. The measurement results of the sliders 3*b* and 3*c* shown in FIGS. 3 and 5 were obtained with use of just one HDD 1.

Figure 8A:
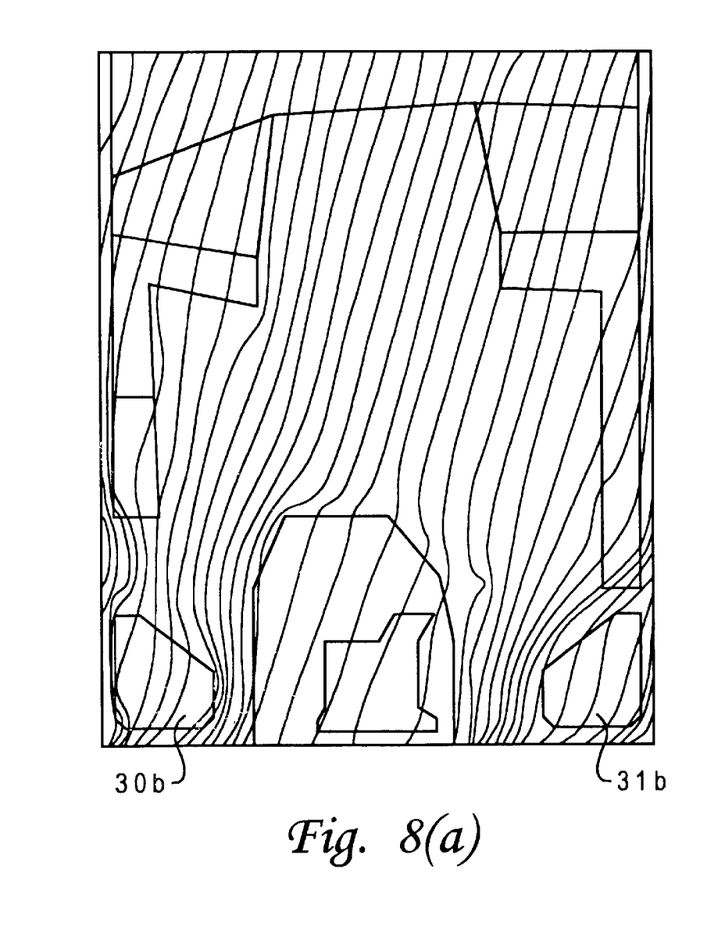
FIGS. 8(a)–(b) show simulation results of an air flow on the ABS of the slider 3b.
Figure 8B:
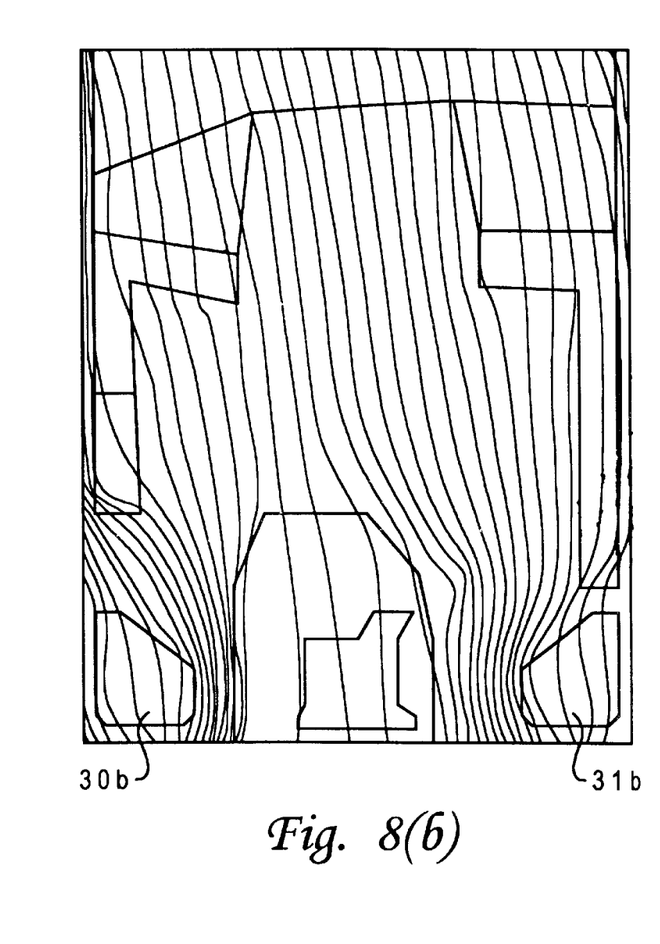
Figure 9A:
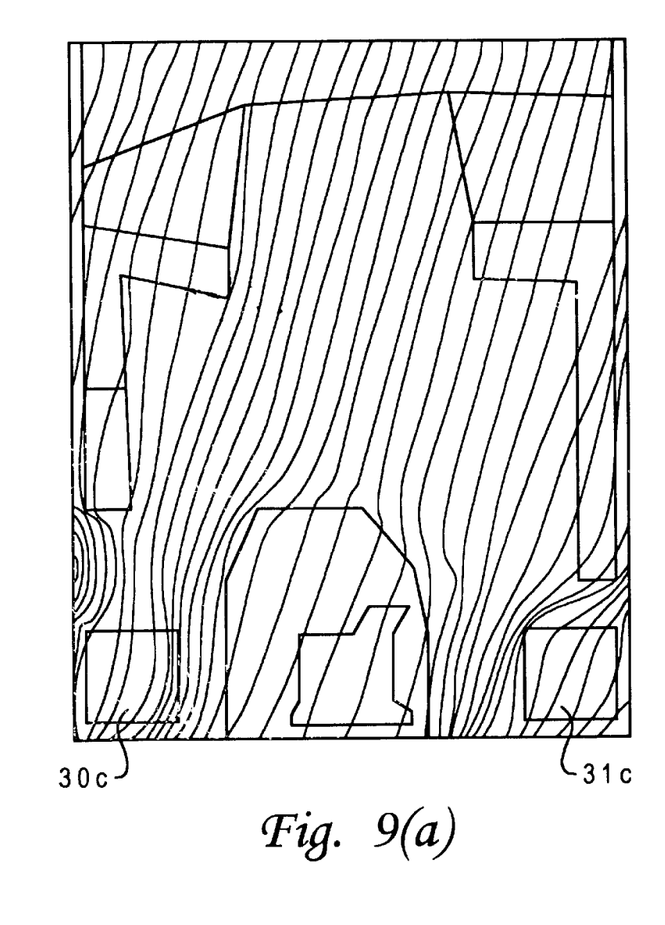
FIGS. 9(a)–(b) show a simulation result of an air flow on the ABS of the slider 3c.
Figure 9B:
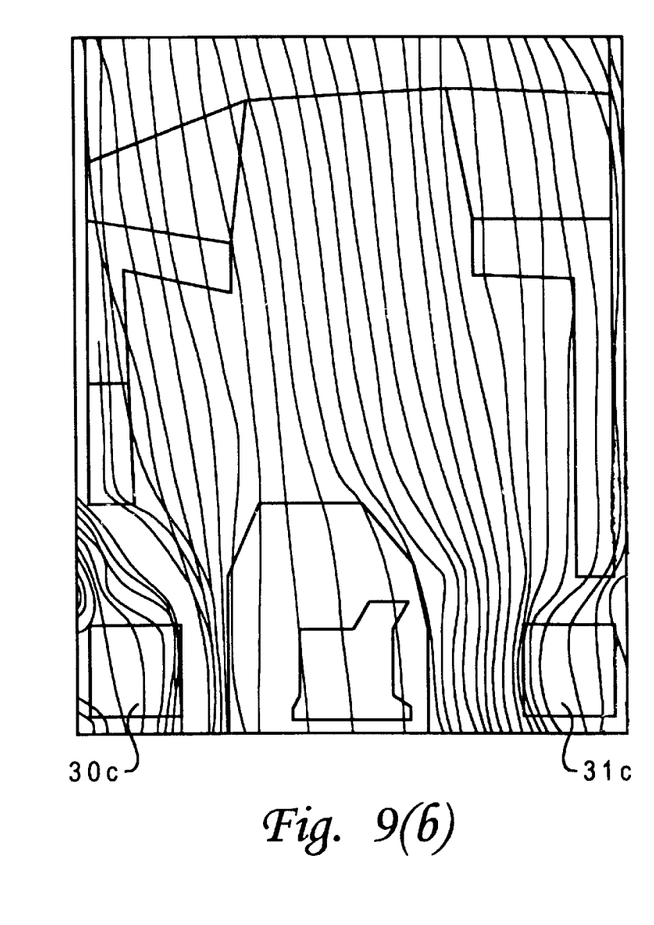

The present inventor measured the air flow on the ABS of the slider 3 by simulation while the magnetic disk 2 is rotating. FIGS. 8 and 9 show the results. FIG. 8 shows the simulation result of the slider 3*b* shown in FIG. 3. FIG. 9 shows the simulation result of the slider 3*c* shown in FIG. 5. FIG. 8(A) and FIG. 9(A) show simulation results when the sliders 3*b* and 3*c* are positioned at the outermost periphery of the magnetic disk 2 respectively and FIG. 8(B) and FIG. 9(B) show the simulation results when the sliders 3*b* and 3*c* are positioned at the innermost periphery of the magnetic disk 2 respectively.

In FIGS. 8 and 9, the inventor paid attention to the air flow around each of the landing pads 30*b* to 30*c*, as well as 31*b* to 31*c*. For the slider 3*b* shown in FIG. 8, the air flow hits the landing pads 30*b* and 31*b*, but the air flow never stagnates. Concretely, the landing pad 31*b* is streamlined to the air flow. When the slider 3*b* is positioned at the outermost periphery of the magnetic disk 2 as shown in FIG. 8(A), it is understood that the air flow coming from the outer edge 13 flows along the inclined plane of the landing pad 31*b*. Even when the slider 3*b* is positioned at the innermost periphery of the magnetic disk 2 as shown in FIG. 8(B), the air flows along the inclined plane of the landing pad 31*b* just like that shown in FIG. 8(A). Consequently, it can be estimated that the air, even when it includes particles, flows so as to clean the inclined plane, so that the particles did not deposit so easily on the landing pads 30*b* and 31*b*. In this case, the slider 3*b* enables the inclined plane to be formed so as to exclude part of each landing pad 30*b*/31*b* in the width direction. However, the inclined plane can also be formed entirely in the width direction. On the contrary, in the case of the slider 3*c* shown in FIG. 9, it is understood that the air flow hits the landing pads 30*c* and 31*c* almost vertically when the slider is positioned at the outermost periphery of the magnetic disk 2 as shown in FIG. 9(A) and when the slider is positioned at the innermost periphery of the magnetic disk 2 as shown in FIG. 9(B). Consequently, it is estimated that particles are apt to deposit on the landing pads 30*c* and 31*c* when the air flow includes particles.

The above measurement results are summarized as follows.

(1) Less read errors are detected with respect to the sliders 3*a* and 3*b* provided with the landing pads 30*a* and 30*b*, as well as 31*a* and 31*b* provided with a convex surface at its side facing the side rails 20 and 21 respectively.

(2) The number of read errors is proportional to the amount of particles deposited on the landing pads 30*a* to 30*c*, as well as 31*a* to 31*c*.

(3) Particles deposit more on the landing pads 31*a* to 31*c* provided at the outer periphery side of the magnetic disk 2 than the landing particles 30*a* to 30*c*, as well as 31*a* to 31*c*.

(4) The air flow does not stagnate or does not stagnate so much on the landing pads 30*a* and 30*b*, as well as on 31*a* and 31*b* provided with a convex surface at its side facing the side rails 20 and 21 respectively. This is because the landing pads 30*a* and 30*b*, as well as 31*a* and 31*b* are streamlined to the air flow.

While the invention has been shown or described in only some of its forms, it should be apparent to those skilled in the art that it is not so limited, but is susceptible to various changes without departing from the scope of the invention.

We claim:

1. A slider disposed to face a disk-like recording medium and enabled to support a head for reading data from and writing data to the medium, comprising:

a slider body provided with a leading edge, a trailing edge, and an air bearing surface formed between the leading and trailing edges;

a rail formed on the air bearing surface such that tips of the rail extend toward the trailing edge;

a plurality of landing pads formed between the tips of the rail and the trailing edge; wherein one of the landing pads has a convex surface facing the rail which is disposed at the outer periphery side of the disk-like recording medium, and the slider is disposed to face the disk-like recording medium; and a pad is formed on the rail adjacent to the leading edge, the pad giving a positive pressure to the slider.

2. The slider of claim 1, wherein the convex surface of the landing pad is formed at a center of the landing pad.

3. The slider of claim 1, wherein a surface for generating a negative pressure is formed on the air bearing surface in an area enclosed by the rail.

4. A head assembly, comprising:

a slider facing a disk-like recording medium and enabled to support a head for reading data from and writing data to the disk-like recording medium;

an actuator for supporting and moving the slider relative to the disk-like recording medium; wherein the slider includes:

a slider body having a leading edge and a trailing edge disposed at a predetermined interval therebetween in a rotational direction of the disk-like recording medium, an inner edge and an outer edge disposed at a predetermined interval therebetween in a radial direction of the disk-like recording medium, and an air bearing surface formed among the leading edge, the trailing edge, the inner edge, and the outer edge;

a cross rail formed along the leading edge;

side rails extended from ends of the cross rail toward the trailing edge;

a first pad formed between the cross rail and a boundary between the side rails and enabled to give a positive pressure to the slider;

landing pads formed at the trailing edge;

a center rail formed between the landing pads; and a second pad formed on the center rail and enabled to give a positive pressure to the slider.

5. The head assembly of claim 4, wherein one of the landing pads, which is disposed at the outer edge, is streamlined to an air flow from the outer edge when the disk-like recording medium rotates.

6. The head assembly of claim 4, wherein the landing pad is provided with an inclined surface along one way of an air flow.

7. The head assembly of claim 4, wherein a negative pressure pocket is formed in an area enclosed by the cross rail and the side rails so as to give a negative pressure to the slider when the disk-like recording medium rotates.

8. A disk drive unit, comprising:

a disk-like recording medium being driven rotationally around a rotary axis and enabled to record data thereon;

a slider provided with a head for writing data to and reading data from the disk-like recording medium;

an actuator for seeking the slider relative to the disk-like recording medium;

an enclosure for housing the disk-like recording medium, the slider, and the actuator; wherein the slider includes:

a slider body provided with a leading edge, a trailing edge, and an air bearing surface formed between the leading and trailing edges;

a U-shaped rail formed on the air bearing surface having a cross rail at the leading edge and a pair of side rails extending from the cross rail toward the trailing edge, each of the side rails having a tip that extends toward the trailing edge;

a pad formed on each of the side rails adjacent to the cross rail to define a pair of pads;

a center rail formed adjacent to the trailing edge separate from the cross rail and having a pad;

a pair of landing pads formed between the tips of the side rails, the center rail, and the trailing edge; wherein one of the landing pads, which is disposed at an outer periphery side of the disk-like recording medium, is provided with an inclined plane inclined in a width direction, and faces the leading edge.

9. The disk drive unit of claim 8, wherein the inclined plane is formed on the landing pad in a width direction.

10. The disk drive unit of claim 8, wherein the inclined plane is inclined in a plurality of directions.

11. The disk drive unit of claim 8, wherein the inclined plane is formed at a predetermined place at which deposition of particles on the landing pad can be suppressed.

* * * * *